United States Patent [19]

Thé et al.

[11] Patent Number: 5,296,177

[45] Date of Patent: Mar. 22, 1994

[54] PROCESS FOR PRODUCING AGGLOMERATES FROM DUSTS

[75] Inventors: Kwat I. Thé; Dirk Noteboom, both of Jonquière; Robert L. Clegg, Chicoutimie-Nord, all of Canada

[73] Assignee: Alcan International Limited, Montreal, Canada

[21] Appl. No.: 972,506

[22] Filed: Nov. 6, 1992

Related U.S. Application Data

[63] Continuation-in-part of Ser. No. 701,108, May 16, 1991, abandoned, which is a continuation-in-part of Ser. No. 697,236, May 6, 1991, abandoned.

[51] Int. Cl.$^5$ .............................................. B29B 9/08
[52] U.S. Cl. .................................. 264/117; 23/313 R; 423/625; 423/629; 501/127
[58] Field of Search ............... 264/117, 109; 423/625, 423/629, DIG. 20, DIG. 18; 23/313 R, 313 P; 501/127

[56] References Cited

U.S. PATENT DOCUMENTS

| | | |
|---|---|---|
| 2,635,950 | 4/1953 | Robinson .......................... 23/313 R |
| 2,876,068 | 3/1959 | Tertian et al. ........................ 23/142 |
| 2,881,051 | 4/1959 | Pingard . |
| 3,011,980 | 12/1961 | Bell .................................... 252/464 |
| 3,222,129 | 12/1965 | Osment et al. . |
| 3,226,191 | 12/1965 | Osment et al. . |
| 3,228,891 | 1/1966 | Duke .................................. 264/117 |
| 3,392,125 | 7/1968 | Kelly . |
| 3,674,241 | 7/1972 | Eirich et al. . |
| 3,690,622 | 9/1972 | Brunner, deceased et al. . |
| 3,701,718 | 10/1972 | Papee . |
| 3,714,313 | 1/1973 | Beiding et al. ....................... 264/117 |
| 4,075,067 | 2/1978 | Bhilotra . |
| 4,124,699 | 11/1978 | Michel et al. ...................... 423/625 |
| 4,159,313 | 6/1979 | Mercier et al. .................... 423/625 |
| 4,159,969 | 7/1979 | Mone et al. ....................... 252/463 |
| 4,169,874 | 10/1979 | Bambrick . |
| 4,343,751 | 8/1982 | Kumar ................................. 264/37 |
| 4,440,866 | 4/1984 | Lunghofer et al. ................. 501/127 |
| 4,579,839 | 4/1986 | Pearson . |
| 4,658,899 | 4/1987 | Fitzgibbon . |
| 4,704,378 | 11/1987 | Fleming et al. . |
| 4,713,203 | 12/1987 | Andrews ............................ 264/117 |
| 4,797,271 | 1/1989 | Fleming et al. . |
| 4,894,285 | 1/1990 | Fitzgibbon ........................ 428/402 |
| 4,921,821 | 5/1990 | Rumpf et al. ...................... 501/128 |

OTHER PUBLICATIONS

Leaflet No. 115e–"Eirich Intensive Mixer Models R 08 / R 09".

*Primary Examiner*—Mary Lynn Theisen
*Attorney, Agent, or Firm*—Cooper & Dunham

[57] ABSTRACT

A process for producing agglomerates from dust (especially electrostatic precipitator dust) collected from a process involving the thermal conversion of a material containing gibbsite to sub-alpha alumina and alpha alumina, and the agglomerates so formed. The process involves binding the dust particles together using water and undercalcined alumina taken from an intermediate stage of the same thermal conversion that originally produces the dust. The added undercalcined alumina is ground, in order to create fresh surfaces, to a median particle size of less than 30 microns and a specific surface area of about 130 to 300 m$^2$/g. About 1–4 parts by weight of the dust are mixed with every part by weight of the ground undercalcined alumina. A special procedure is employed for mixing the solids and water which makes use of intensive mixing. At first about 50–80% by weight of the estimated amount of water required is mixed with the solids in a single addition and the mixing is carried out for at least about 30 minutes. The remainder of the water is then added at a slow rate of addition while the mixing is continued. The resulting agglomerates are aged for at least 2 hours at a temperature of at least 80° C. in an atmosphere of high relative humidity in order to strengthen the agglomerates. Calcining without sintering may also be carried out. The resulting dust agglomerates can be handled without significant fracturing or dust generation, contain no added contaminants, are inexpensive to produce and can be returned to the product stream of the thermal conversion process that initially produced the dust.

9 Claims, No Drawings

PROCESS FOR PRODUCING AGGLOMERATES FROM DUSTS

CROSS REFERENCE TO RELATED APPLICATION

This application is a continuation-in-part of copending U.S. patent application Ser. No. 07/701,108, filed May 16, 1991, which is itself a continuation-in-part of prior patent application Ser. No. 07/697,236 filed May 6, 1991, both now abandoned.

BACKGROUND OF THE INVENTION

I. Field of the Invention

This invention relates to the preparation of strong agglomerates from airborne dusts, especially electrostatic precipitator (ESP) dust, derived from a process of converting a material containing predominantly gibbsite to sub-alpha alumina or corundum (alpha alumina), and to the agglomerates thus produced.

II. Discussion of the Prior Art

Material containing predominantly gibbsite (alumina trihydrate, $Al_2O_3.3H_2O$) is produced by the Bayer process and is thermally converted into sub-alpha alumina (or corundum) of low water content, typically less than 3%, by a multi-stage heating process. Airborne dust is produced during this process and is usually collected by means of electrostatic precipitators in order to avoid environmental pollution. The suspended or airborne dust collected in this way is a very fine undercalcined alumina having a particle size which may vary according to the shape or density of the particles and according to the gas or air velocity. Typically, more than 90% of the dust is in the form of particles less than 20 microns in size and the particles generally have a median size of 3–5 microns. The dust usually consists of a mixture of fully calcined (anhydrous) alumina, partially calcined alumina and uncalcined (trihydrate) alumina particles which collectively exhibit a loss of mass (LOM) on heating from ambient to 1100° C. (sometimes referred to as loss on ignition—LOI) of between 1 and 35% by weight.

Attempts have been made to utilize such dust by adding it to the bauxite feed of the Bayer digestion process or by recycling the dust to other process feeds or product lines. However, this is not very satisfactory because the dust is difficult to handle and may not contain the proper ingredients for the processes or products involved. For example, ESP dust generally contains 5–80% of a form of alumina which does not undergo caustic digestion when used in the Bayer process and thus ends up in the "red mud" waste product of the process, which itself presents disposal problems. As a result, ESP dust is often slurried and pumped to a disposal site.

Dusts of this kind would be much easier to handle if they could be agglomerated into particles of larger size. This could be achieved by the use of suitable binders (e.g. various polymers, etc.) followed by pelletization or the like, but polymeric binders tend to be expensive and remain in the product as contaminants, making the product unsuitable for recycling to various processes, and would be eliminated at the high temperatures used in various treatment processes, leading to easy fracture of the particles and regeneration of the original dust.

Several processes are already known for the agglomeration of particles of alumina but these involve complex and expensive steps and generally do not relate to the treatment of dust, i.e. particles of such a small size that the particles easily become airborne.

For example, U.S. Pat. No. 4,169,874 to Bambrick teaches that shaped alumina particles can be produced by preparing an aqueous slurry of an alumina composition containing a substantial portion of rehydratable alumina, and then subjecting the slurry to shaping, rehydrating and curing. The shaped bodies are formed by first making a slurry having a solids content from 50–60% and passing it through an immiscible phase at a temperature from 80°–100° C.

Furthermore, U.S. Pat. No. 4,579,839 to Pearson discloses a process in which flash activated alumina is used to bond ceramic bodies together. Agglomeration and shaping is then carried out in a hot liquid which is immiscible in water.

However, such processes are not well suited to the treatment of dusts and tend to be too expensive for application to a waste material.

OBJECTS OF THE INVENTION

It is therefore an object of the invention to provide a process for producing strong agglomerates from dusts produced by the thermal treatment of hydrated alumina in order to facilitate the handling and utilization of such dusts.

Another object of the invention is to provide a process for producing agglomerates from such dusts, which makes possible the return of the dust to the product line from which the dust was originally generated.

Yet another object of the invention is to provide a process for producing strong agglomerates from such dust which process can be carried out inexpensively and relatively easily.

A still further object of the invention is to provide a process for improving the yield of the thermal conversion of hydrated aluminas to alpha or sub-alpha alumina by capturing dust generated by the process and returing it to the product line in a utilizable form.

SUMMARY OF THE INVENTION

In one aspect, the present invention provides a process for producing unsintered agglomerates from dust collected during the thermal conversion of a material containing predominantly gibbsite to sub-alpha alumina and alpha alumina by a multistage thermal process having at least one intermediate stage. The process comprises removing undercalcined alumina from an intermediate stage of the thermal conversion; grinding particles of the undercalcined alumina to a median particle size of less than 30 microns and to a specific surface area in the range of 130–300 $m^2/g$; combining about 1–4 parts by weight of the dust with one part by weight of the ground undercalcined alumina to form combined solids; mixing the combined solids with water to produce agglomerates; and aging the resulting agglomerates in a closed environment at a temperature of at least 80° C. for at least 2 hours in at least 90% humidity.

The water is mixed with the combined solids by intensive mixing, the total amount of added water being about 0.8–1.2 parts by weight for every part by weight of the ground undercalcined alumina plus about 0.08 to 0.12 parts by weight for every part by weight of the dust. The water is added according to the following scheme: (a) adding 50–80% of the total amount of water as a single addition to the mixed solids and mixing the solids and water by intensive mixing for a period of at least 30 minutes, and then (b) adding the remainder of the water at a rate of about 0.01 to 0.07 parts by weight per minute while continuing the intensive mixing until the total amount of water has been added.

The invention also relates to agglomerates produced by the process.

By the term "undercalcined alumina" we mean a form of alumina (sometimes referred to as gamma alumina) which has been partially, but not fully, converted from alumina trihydrate or alumina monohydrate to sub-alpha alumina or alpha alumina and which has the ability to react with water to revert back to more hydrated forms.

By the term "intermediate stage" of the thermal conversion we mean a stage within which the original hydrated alumina has not yet been fully converted to the final sub alpha or alpha alumina. In most processes used for the thermal conversion, e.g. process involving fluidized beds, suspended particles or the use of cyclones, the equipment has several physically separated zones confined within different reactors. In other processes, e.g. those using rotary kilns, the heating is carried out in a single reactor, but there are different treatment zones within the reactor indicated by regions of different temperature within the material mass. In the present invention, the intermediate stage from which the undercalcined material is taken may be one of the physically separate zones of multi-reactor equipment, or one of the intermediate temperature regions of single reactor equipment. In general, any intermediate thermally treated material that contains undercalcined alumina is suitable for use in the invention.

The process of the invention can be operated very inexpensively because the undercalcined alumina used as a binder for the ESP dust can be removed from an intermediate stage of the same thermal process which produces the dust, and the agglomerates may be returned to an intermediate stage or final product stream of the same thermal process. The materials are all thus readily available, the product is disposed of conveniently and there is no harm to the product of the thermal conversion because the dust agglomerates do not contain any foreign materials or adulterants not already found in the product. In fact, the agglomerated ESP dust generally has identical properties to the final product of the thermal conversion and thus can be used in identical ways to that product.

The agglomerates are strong without being sintered and do not disintegrate significantly upon manipulation in mechanical conveying systems.

DETAILED DESCRIPTION OF THE PREFERRED EMBODIMENTS

The present invention relies on the use of water and undercalcined alumina, taken from an intermediate stage in the process for the thermal conversion of alumina which produced the airborne dust in the first place, to bind the dust particles together, thus permitting the formation of strong agglomerates containing no foreign impurities. The dust itself may be collected in any suitable way, but is most usually collected in electrostatic precipitators and is then referred to as electrostatic precipitator (ESP) dust. While the following description mentions mainly ESP dust for the sake of convenience, it should be kept in mind that airborne dust collected in other ways may be used in the invention.

The undercalcined material differs from the dust with regard to the extent of conversion to sub alpha alumina (the dust is generally more highly converted or more calcined) and with regard to particle size (the dust is much finer). The material may vary in size, but is often in the 80–85 micron median size range. Suitable undercalcined alumina can be obtainable, for example, from the primary cyclone of a fluid flash alumina calciner.

The undercalcined material is first ground to a smaller size range, e.g. less than 30 microns median size, before being mixed with the dust. This exposes fresh surfaces which are more reactive and reduces the particles size so that better packing with the dust results. The grinding step generally increases the surface area of the material to the range of 130 to 300 $m^2/g$.

The grinding step may be carried out in any suitable grinding apparatus, for example a ball mill, a rod mill or a jet mill.

The ESP dust is then mixed with the ground undercalcined alumina to form a solids mixture, the ratio of admixture of the dust to the ground undercalcined material being about 1–4:1 parts by weight, respectively. The LOM of the resulting solids mixture is generally between 1–35% (preferably 1–25%). If the LOM is less than 1%, the mixture contains insufficient ground undercalcined alumina.

The solids mixture produced in the indicated manner is then mixed with water (or the solids and water may be mixed essentially simultaneously) so that the required agglomerates can be formed. The amount of water required to produce suitable agglomerates depends to some extent on the size of the agglomerates desired and the nature of the ESP dust and ground undercalcined alumina, but is optimally about 1 part by weight of water for each part by weight of ground undercalcined material plus 0.1 part by weight of water for each part by weight of ESP dust. Thus, for a mixture consisting of 4 parts by weight of ESP dust and 1 part by weight of ground undercalcined alumina, the optimal amount of water would be about 1.4 parts by weight. However, a variation of ±20% around the optimal figure is usually acceptable. A larger amount of water tends to result in the formation of large clumps and can reduce the strength of any agglomerates that are formed, or results in the formation of a slurry of dust. A smaller amount of water results in little or no bonding of the dust particles.

The water is added in two distinct portions. Firstly, about 50–80% of the total water to be added is added all at once as a single portion and the mixture is mixed for a period of about 30 minutes in a suitable agglomeration apparatus, during which time it appears that "seed" agglomerates are formed and the water has suitable surface tension to keep the seed agglomerates together. Then the remainder is added at a suitably slow rate, e.g. the rate of about 0.5 L/min (0.015 parts by weight/min), until the addition is complete while mixing is continued. During this time more solids material is picked up by the seed agglomerates and the desired compaction occurs. During the initial mixing process, all of the water is absorbed. The final water addition provides the water necessary to rehydrate the undercalcined material. If the water is added all at the same time, or the second addition is made too rapidly, undesirably large agglomerates are formed due to localized overwetting.

The total time required for agglomeration depends on the batch size. For example, for a batch comprising 52 kg of ESP dust, 27 kg of ground undercalcined alumina and 27 kg of water, the mixing procedure may be as follows. After the initial addition of 80% of the 27 kg of water, seed agglomerates would be formed after approximately 30 minutes. The remaining 20% of the water would then be added at a rate of 0.5 L/min over 14 minutes. The total time for the operation would thus be 44 minutes.

The agglomeration of the mixture is carried out by intensive mixing. Intensive mixing is a procedure which makes use of all of the directions of movement of the mix in a mixing chamber, with simultaneous rapidly acting energy input. Intensive mixing makes it possible to control the size of the agglomerates precisely and is advantageous because it creates a forceful impact of the solids mixture with water, thereby creating small agglomerates. Highly desirable generally spherical particles having a size in the range 0.05 to 2 mm may be produced in this way. Other agglomeration devices which do not rely on intensive mixing, e.g. pan pelletizers, provide less aggressive mixing resulting in acceptably large agglomerates.

In a preferred form of the invention, the mixing is carried out in an intensive mixer of the Eirich type as described in U.S. Pat. No. 3,674,241 to Eirich et. al. and U.S. Pat. No. 3,690,622 to Brunner et. al., the disclosures of which are incorporated herein by reference. The Eirich mixture is preferably operated at a pan speed of about 65 rpm and with a rotor peripheral speed of 40 m/sec or more, optimally about 43 m/sec. These speeds are preferred because they suitably influence the size of the agglomerates and the extent of compaction, and thus affect the final strength of the agglomerates. Other intensive mixers may not involve a pan and instead may comprise a rotating drum and a stationary blade inside the drum. These mixers should be operated at a suitable speed of rotation to produce the desired particle and compaction.

After their formation, the agglomerates are made to undergo an aging process which involves holding the agglomerates under conditions of high humidity (at least 90% and preferably 100%) at a temperature of at least 80° C., more preferably 80°-100° C., for a period of at least 2 hours in a closed environment. To achieve this, it is usually sufficient merely to place the product of the mixing step directly into a sealed container or conveyor system without providing heating or humidification because the rehydration process is exothermic and the heat thus generated raises the temperature of the agglomerates to the desired extent, and the excess water in the agglomerates leads to the formation of a humid atmosphere in the closed system. The humidification is normally carried out at atmospheric pressure, although elevated pressure could be employed, if desired, and results in full rehydration of the alumina which provides strength and resistance to breakdown during subsequent handling.

While not wishing the invention to be limited to any particular theory, it is believed that the undercalcined alumina undergoes a form of polymerization involving hydroxyl bonds in the presence of water and bonds to or traps the ESP dust in its matrix. The final aging step helps to complete the polymerization and thus to improve the strength of the product.

Following the aging step, the agglomerates are suitable for use for a number of applications without further treatment. However, the agglomerates may be dried (e.g. at a temperature of up to 200° C.) and/or calcined (e.g. at a temperature of between 200° and 2000° C.). Calcination converts the alumina to a fully anhydrous form which may be required in certain applications, e.g. for addition to molten salt electrolysis cells.

During the calcination step, sintering should be avoided because a sintered product may not be suitable for return to a product line or for other commercial use.

The invention is illustrated by the following non-limiting Examples.

EXAMPLE 1

ESP alumina dust (from an Alcan fluid flash calciner works at Jonquiére, Quebec) having a median particle size of about 5 μm was mixed with ground undercalcined alumina and water in the proportions shown in Table 1 below. Pellets (agglomerates) having the median sizes shown in the Table were produced by means of an Eirich mixer (laboratory model No. RV02). The pellets were aged in water vapour at 90° C. for 4 hours, dried at about 140° C. for 60 minutes and calcined at 900° C. for 60 minutes. The attrition indices of the resulting pellets are shown in the Table and these values indicate that the breakage during handling due to attrition would be negligible. In addition, the pellets showed considerable resistance to breakage when subjected to physical force exerted by hand.

TABLE 1

SUMMARY OF EXPERIMENTAL RESULTS ON AGGLOMERATING ESP DUST WITH UNDERCALCINED ALUMINA

| RATIO (BY WEIGHT) | | | MEDIAN | ATTRITION INDEX % | |
|---|---|---|---|---|---|
| ESP DUST | UNDER CALCD. ALUM. | $H_2O$ | SIZE OF AGGLOM- ERATES | DRIED 140° C. | CALC. 900° C. |
| 2700 | 1300 | 1300 | >150μ | 1 | 4 |
| 2700 | 1300 | 1250 | >150μ | 11 | |
| 2700 | 1300 | 1325 | >150μ | | 4 |
| 2850 | 1150 | 1325 | >150μ | | 0 |
| 3000 | 1000 | 1250 | 150μ | | 21 |

EXAMPLE 2

Pellets were produced in the manner indicated below using undercalcined alumina from the following sources.

SOURCES OF ALUMINA

A) FROM FLASH CALCINATION

A stream of alumina trihydrate was allowed to come into contact with a flame having a temperature range of 800°-3000° C. at a feed rate adjusted to produce a contact time of one second or less. The alumina was then rapidly cooled in a dry environment.

B) FROM OVEN CALCINATION

Alumina trihydrate, evenly spread in a container to produce a large surface area, was heated in an oven to about 400° C. for 60–120 minutes and then cooled in a dry environment or in a desiccator.

The undercalcined alumina obtained from these sources was ground to a particle size of less than 30 microns in a ball mill or jet mill.

Various batches of pellets were produced by adding 4 Kg of a mixture of the undercalcined alumina and ESP dust to an Eirich mixer type RV02 having an operating capacity of about 12 Kg and dry mixed with an impeller. The table pan was rotated at 75 rpm and the impeller was rotated at about 2000 rpm and water was gradually added in an amount up to about 1300 ml, depending on the size of the final product (it was noted that a slower impeller speed and a larger quantity of water resulted in the production of larger pellets). The table pan and the impeller were kept rotating until pellets were formed, usually after 10 to 45 minutes. The pellets were dried, subjected to an aging procedure in the conditions indicated below and then calcined at 900° C.

Tables 2, 3 and 4 below show the effects of different aging times, ratios of dust to undercalcined alumina and quantities of water on the strength of the pellets and on the pellet size.

TABLE 2

EFFECT OF DURATION OF AGING ON THE STRENGTH OF AGGLOMERATES
2 ESP: 1 UNDERCALCINED ALUMINA
(Size of Agglomerate*: 0.066" (1.675 mm))

| TIME OF AGING HOURS | RESISTANCE OF AGGLOMERATE KG/AGGLOM. | LB/INCH² | L.O.I. % |
|---|---|---|---|
| 0 | 1.1 ± 0.5 | 556 (±253) | 20 |
| 2 | 2.0 ± 0.6 | 1011 (±303) | 16 |
| 4 | 2.1 ± 0.5 | 1062 (±253) | 16 |
| 6 | 3.7 ± 1.1 | 1871 (±556) | 15 |
| 20 | 5.6 ± 1.4 | 2832 (±708) | — |

*Av. size from −8 mesh (0.093" or 2.362 mm) +16 mesh (0.039" or 0.99 mm)

TABLE 3

EFFECT OF RATIO ESP: UNDERCALCINED ALUMINA ON STRENGTH OF AGGLOMERATE
(AGED FOR 16 HOURS AND CALCINED AT 900° C.)

| RATIO ESP: UNDER- CALCINED ALUMINA | RESISTANCE OF AGGLOMERATE KG/ AGGLOM | LB/INCH² | ATTRI- TION INDEX % | MIXER TIME MIN. |
|---|---|---|---|---|
| 2:1 | 6.5 ± 2 | 3287 (±1011) | =6 | 30 |
| 3:1 | 4.6 ± 1.2 | 2326 (±607) | =6 | 35 |
| 4:1 | 3.2 ± 1 | 1617 (±506) | =6 | 45 |

TABLE 4

EFFECT OF QUANTITY OF WATER ON SIZE DISTRIBUTION OF AGGLOMERATES
ESP: UNDERCALCINED ALUMINA - 3:1
TOTAL WEIGHT SOLIDS, 4 Kg

| Size Fractions | with H₂O 1300 ml | with H₂O 1350 ml |
|---|---|---|
| +500μ | 0.5 | 3.9 |
| +250μ | 21.3 | 58.1 |
| +150μ | 24.9 | 17.8 |
| +106μ | 17.6 | 5.6 |
| +75μ | 14.8 | 5.1 |
| +53μ | 6.1 | 3.1 |
| +45μ | 1.7 | 0.7 |
| −45μ | 13.1 | 5.7 |

EXAMPLE 3

ESP dust (52 kg) and activated alumina AA-101 (26 kg) as a substitute for undercalcined alumina from an intermediate stage in a thermal conversion process were added to an Eirich mixer model R09T, having a plugged viewing port and other holes to avoid escape of dust, by means of the programmable logic system and the mixture was then dry mixed for 1 minute. Water (20 L, 80% of the intended 27 L total) was added in a single portion to the mixture while the rotor was in operation at a tip speed of 25 m/sec. The mixing was continued for 30 minutes, and then the remaining 20% of the water was added at 1 L/2 minutes. Analysis of the size distribution of the resulting agglomerates is shown in Table 5, column 1.

TABLE 5

Typical Size Distribution of ESP Dust/Activated Alumina Agglomerates Prepared on Eirich Mixer R09T at 3 Different Tip Speeds

| Size (microns) | % Fraction of Pellets Prepared With | | |
|---|---|---|---|
| | 25 m/sec | 30 m/sec | 40 m/sec |
| +2360 | 0.2 | | |
| +1168 | | 19.2 | 8.8 |
| +833 | | 25.0 | 16.4 |
| +495 | 36.8 | 36.4 | 45.5 |
| +351 | | 7.0 | 15.0 |
| +250 | | 3.3 | 6.6 |
| +150 | 22.4 | 2.2 | 3.0 |
| +45 | 28.1 | 2.1 | 3.0 |
| −45 | 12.3 | 5.0 | 1.6 |

Another experiment was carried out using the procedure above, except that a high tip speed of 30 m/sec and a low tip speed of 15 m/sec were employed. The results of the size analysis is shown in Table 5, column 2.

A further experiment was carried out as above but using a tip speed of 40 m/sec (more accurately 43 m/sec). The result of the size distribution analysis on the product pellets is shown in Table 5, column 3.

EXAMPLE 4

The procedure developed in Example 3 was used for producing 25 tons of agglomerates.

Table 6 shows typical data on the size distribution of the agglomerates and Table 7 shows the physical characteristics of the resulting agglomerates.

TABLE 6

Size Distribution Data of Composite Grab Samples of ESP Dust/Activated Alumina Pellets Made on a Semi-Industrial Scale (25 tons)

| Size (Microns) | Composite Sample* Number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| +1168 | 5.2 | 8.2 | 6.6 | 2.8 | 7.8 | 3.1 | 3.6 | 4.4 | 3.3 | 7.3 | 6.5 | 9.7 |
| +700 | 28.5 | 38.7 | 34.1 | 26.4 | 29.6 | 13.7 | 20.3 | 23.3 | 12.6 | 32.7 | 11.8 | 33.1 |
| +495 | 41.5 | 31.6 | 35.4 | 29.6 | 38.8 | 29.5 | 40.3 | 39.8 | 36.4 | 43.5 | 30.8 | 31.1 |
| +350 | 13.4 | 10.1 | 8.2 | 20.1 | 13.5 | 33.1 | 20.3 | 16.6 | 26.3 | 7.0 | 22.5 | 15.3 |
| +245 | 3.9 | 4.4 | 5.2 | 5.4 | 3.7 | 10.7 | 5.4 | 4.8 | 7.7 | 3.2 | 15.2 | 3.5 |
| +147 | 2.4 | 2.8 | 2.7 | 3.9 | 2.1 | 3.5 | 3.2 | 3.0 | 4.1 | 1.8 | 4.1 | 1.7 |
| +45 | 1.8 | 1.8 | 2.9 | 6.2 | 1.9 | 3.6 | 3.9 | 4.4 | 5.2 | 1.2 | 3.9 | 2.9 |
| −45 | 3.3 | 2.3 | 4.9 | 5.6 | 3.2 | 3.4 | 4.0 | 3.7 | 4.6 | 3.3 | 5.6 | 3.4 |

*Composite of Grab Samples of 11-12 batches of 80 kg.

The size distribution is unimodal with 78% of the agglomerates falling within the range of +350 microns and −1200 microns. The major fraction falls at the +495 micron size.

TABLE 7

Comparative Data on Physical Characteristics of ESP Dust/Activated Alumina Aggglomerates Prepared at ca. 30 m/sec and ca. 40 m/sec Tip Speed vs. Vaudreuil and Ewarton C1

| Parameters | ESP Dust/Activated Alumina Agglomerates Prepared with a Tip Speed of | | | | Alcan C1 | |
|---|---|---|---|---|---|---|
| | 30 m/sec | | 43 m/sec | | | |
| | Green | Calcined | Green | Calcined | Vaudreuil | Ewarton |
| SSA $m^2/g$ | 74 | 74 | 72 | 58 | 57-72 | 72-84 |
| Bulk Density | | | | | | |
| min | 1.02 | 0.95 | 1.08 | 0.96 | 0.7 | 0.85 |
| max | 1.16 | 1.00 | 1.20 | 1.04 | 0.9 | 1.05 |
| Real Density | 3.39 | 3.55 | 2.86 | 3.47 | | |
| L.O.I. | 13.8 | 1.3 | 13.5 | 1.1 | 0.7-0.9 | 1.0-1.2 |
| Apparent Porosity | 62.0 | 71.7 | 61.9 | 70.8 | 6.6 | |
| Moisture % | 20.0 ± 1.1 | — | 19.4 ± 0.4 | — | | |
| Attrition Index % | 7.6 | 3.2 | 6.4 | 4.1 | 10-13 | 26-33 |

What we claim is:

1. A process for producing unsintered agglomerates from dust collected during the thermal conversion of a material containing predominantly gibbsite to sub-alpha alumina by a multistage thermal process having at least one intermediate stage, which process comprises:

removing undercalcined alumina from an intermediate stage of said thermal conversion;

grinding particles of said undercalcined alumina to a median particle size of less than 30 microns and to a specific surface area in the range of 130-300 $m^2/g$;

combining about 1-4 parts by weight of the dust with one part by weight of said ground undercalcined alumina to form combined solids;

mixing the combined solids with water to produce agglomerates; and aging the resulting agglomerates in a closed environment at a temperature of at least 80° C. for at least 2 hours in at least 90% humidity;

wherein the water is mixed with said combined solids by intensive mixing, the total amount of added water is about 0.8-1.2 parts by weight for every part by weight of said ground undercalcined alumina plus about 0.08 to 0.12 parts by weight for every part by weight of said dust, and the water is added according to the following scheme;

(a) adding 50-80% of said amount of water as a single addition to said mixed solids and mixing said solids and water by intensive mixing for a period of at least 30 minutes, and then (b) adding a remainder of said water at a rate of about 0.01 to 0.07 parts by weight per minute while continuing said intensive mixing until said total amount of water has been added.

2. A process according to claim 1 wherein said dust is electrostatic precipitator dust.

3. A process according to claim 1 wherein said undercalcined alumina has a median particle size in the range of about 80-85 microns before said grinding is carried out.

4. A process according to claim 1 wherein the resulting agglomerates have a size in the range of 0.05 to 2 mm.

5. A process according to claim 1 which further comprises drying said agglomerates at a temperature up to 200° C. following said aging.

6. A process according to claim 1 which further comprises calcining without sintering said agglomerates following said aging at a temperature between 200° and 2000° C.

7. A process according to claim 1 wherein said undercalcined alumina is a material collected from a primary cyclone of an alumina calciner employed for said thermal process.

8. A process according to claim 1 wherein said intensive mixing is carried out to produce generally spherical agglomerates having a size in the range of 0.05-2 mm.

9. In a process of thermally converting a material containing predominantly gibbsite to sub-alpha alumina in a multi-stage procedure involving at least one intermediate stage, the improvement which comprises:

collecting dust from said process;

removing undercalcined alumina from an intermediate stage of said thermal conversion;

grinding particles of said undercalcined alumina to a median particle size of less than 30 microns and to a specific surface area in the range of 130-300 $m^2/g$;

combining about 1-4 parts by weight of the dust with one part by weight of said ground undercalcined alumina to form combined solids;

mixing the combined solids with water to produce agglomerates;

aging the resulting agglomerates in a closed environment at a temperature of at least 80° C. for at least 2 hours in at least 90% humidity; and returning said agglomerates to a product stream of said thermal process;

wherein the water is mixed with said solids by intensive mixing, the total amount of added water is about 0.8-1.2 parts by weight for every part by weight of said ground undercalcined alumina plus about 0.08 to 0.12 parts by weight for every part by weight of said dust, and the water is added according to the following scheme:

(a) adding 50-80% of said total amount of water as a single addition to said mixed solids and mixing said solids and water by intensive mixing for a period of at least 30 minutes, and then (b) adding a remainder of said water at a rate of about 0.01 to 0.07 parts by weight per minute while continuing said intensive mixing until said total amount of water has been added.

* * * * *